United States Patent
Kaufmann et al.

(10) Patent No.: US 11,117,203 B2
(45) Date of Patent: Sep. 14, 2021

(54) CUTTING INSERT HOLDER AND APPLICATIONS THEREOF

(71) Applicant: Kennametal Inc., Latrobe, PA (US)

(72) Inventors: Igor Kaufmann, Fuerth (DE); Raouf Benamor, Fuerth (DE); John Musil, Mantua, OH (US); Shiva Pinnoju, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 152 days.

(21) Appl. No.: 16/227,856

(22) Filed: Dec. 20, 2018

(65) Prior Publication Data

US 2020/0198027 A1    Jun. 25, 2020

(51) Int. Cl.
*B23C 5/22* (2006.01)

(52) U.S. Cl.
CPC .......... *B23C 5/22* (2013.01); *B23C 2200/367* (2013.01); *B23C 2220/00* (2013.01)

(58) Field of Classification Search
CPC ................ B23C 5/22; B23C 2200/367; B23B 2205/125
See application file for complete search history.

(56) References Cited

U.S. PATENT DOCUMENTS

| | | | | |
|---|---|---|---|---|
| 530,793 | A * | 12/1894 | Odgers | B23C 5/22 407/47 |
| 3,351,998 | A * | 11/1967 | Theiler | B23B 51/0466 407/34 |
| 4,072,437 | A * | 2/1978 | Smith | B23C 5/22 407/118 |
| 4,743,144 | A * | 5/1988 | Shikata | B23C 5/207 407/42 |
| 4,744,278 | A * | 5/1988 | Wright | B23C 5/22 144/218 |
| 4,932,813 | A * | 6/1990 | Qvart | B23C 5/2239 407/36 |
| 8,454,275 | B2 * | 6/2013 | Ribbeck | B23C 5/2479 407/25 |
| 9,561,551 | B2 * | 2/2017 | Diego | B23C 5/22 |
| 2004/0161311 | A1 * | 8/2004 | Satran | B23C 5/08 407/46 |
| 2019/0351493 | A1 * | 11/2019 | Kinoshita | B23C 5/28 |

FOREIGN PATENT DOCUMENTS

| | | | | |
|---|---|---|---|---|
| DE | 1260926 B | * | 2/1968 | ........... B23C 5/2472 |
| DE | 3807542 A1 | * | 9/1989 | ........... B23D 37/005 |
| EP | 1629915 A1 | * | 3/2006 | ........... B23B 29/248 |

OTHER PUBLICATIONS

Tool and Manufacturing Engineer's Handbook, vol. 1, Fourth Edition, pp. 10-31-10-34 (Year: 1984).*

* cited by examiner

*Primary Examiner* — Alan Snyder
(74) *Attorney, Agent, or Firm* — Christopher J. Owens

(57) ABSTRACT

Holders are described herein providing secure clamping and/or positioning of cutting inserts. Briefly, a holder for a cutting insert comprises a base and a slot for receiving the cutting insert, wherein the slot forms an angle with the base ranging from 10 degrees to 60 degrees.

25 Claims, 3 Drawing Sheets

CUTTING INSERT HOLDER AND APPLICATIONS THEREOF

FIELD

The present invention relates to holders for cutting inserts and associated cutting apparatus and, in particular, to holders for superhard inserts for tangential cutting applications.

BACKGROUND

Tangential milling is a special case where the cutting tool's inserts are mounted around the outer diameter of the cutting tool. This is in contrast to traditional milling where the cutting inserts mount along the radius of the tool body. In being arranged along the cutting tool outer diameter, the inserts adopt a flat orientation, thereby directing the cutting forces to the thickest part of the insert. This enables enhancements to edge life under harsh cutting conditions, including rough milling where larger depths of cut are required. Moreover, tangential milling cutters can exhibit increased core diameter relative to traditional milling cutters. Increasing core diameter can enhance overall strength of the tool.

The harsh cutting conditions associated with tangential cutting apparatus places additional emphasis on secure clamping or holding of cutting inserts. Loss of secure clamping can significantly affect the quality of cut and damage the cutting inserts and/or milling head. Damage to cutting inserts is particularly problematic since expensive superhard or ultrahard materials are often employed in tangential applications.

SUMMARY

In view of these considerations, holders are described herein providing secure clamping and/or positioning of cutting inserts. In some embodiments, such holders can enable use of cutting inserts of reduced dimension, thereby providing cost efficiencies for inserts comprising superhard materials. Briefly, a holder for a cutting insert comprises a base and a slot for receiving the cutting insert, wherein the slot forms an angle with the base ranging from 10 degrees to 60 degrees. In some embodiments, the base and slot are formed in the head of a cutting apparatus, such as a tangential cutting apparatus. Alternatively, the holder is independent from the cutting apparatus and is configured to engage a pocket of a cutting apparatus.

In another aspect, cutting apparatus are described herein, including tangential cutting apparatus. A tangential cutting apparatus, for example, comprises a cutting head, and at least one holder for a cutting insert, the holder comprising a base, and a slot for receiving the cutting insert, wherein the slot forms an angle with the base ranging from 10 degrees to 60 degrees.

In a further aspect, methods of machining a workpiece are described. A method of machining a workpiece comprises providing a tangential cutting apparatus comprising a cutting head and at least one holder engaging a cutting insert, the holder comprising a base, and a slot for receiving the cutting insert, wherein the slot forms an angle with the base ranging from 10 degrees to 60 degrees. The workpiece is contacted with the cutting insert. In some embodiments, the cutting head is rotated to contact the workpiece with the cutting insert. A plurality of cutting inserts can be coupled to the cutting head via slotted holders, in some embodiments.

These and other embodiments are further described in the following detailed description.

DETAILED DESCRIPTION

Figure 1:
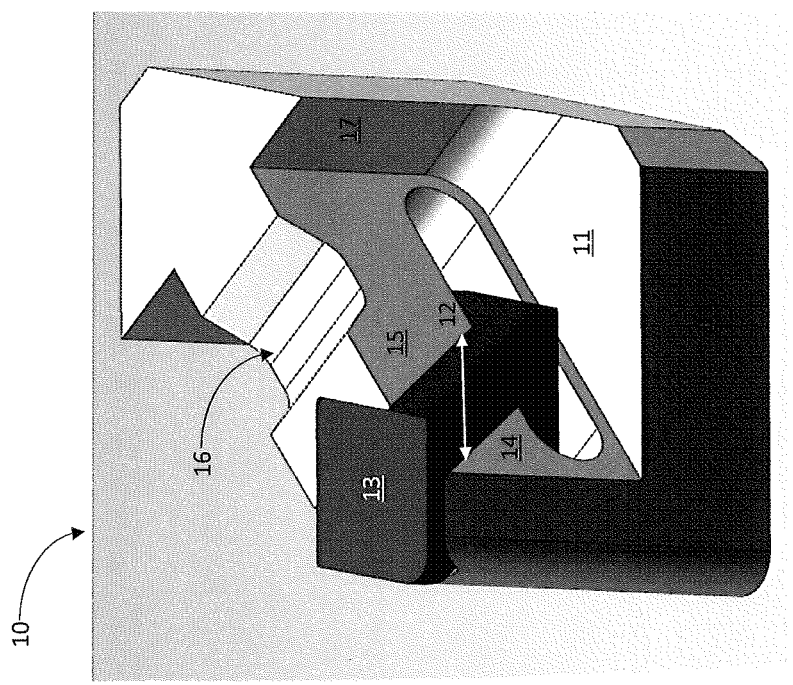
FIG. 1 illustrates a perspective view of a cutting insert holder according to some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, holders for cutting inserts are described herein. A holder for a cutting insert comprises a base and a slot for receiving the cutting insert, wherein the slot forms an angle with the base ranging from 10 degrees to 60 degrees. In some embodiments, the angle formed between the slot and base ranges from 20 degrees to 35 degrees. The value of the angle can be chosen according to several considerations including, but not limited to, type of cutting insert, geometry of the cutting insert, dimensions of the insert, and/or orientation of the insert in the slot. For example, the value of the angle formed between the slot and base can be selected to place the cutting insert in an orientation to exhibit an included angle of at least 80 degrees. Included angle of the cutting insert in the slot may also be 90 degrees or 100 degrees.

The slot can be defined by walls extending outwardly or vertically from the base. In some embodiments, for example, opposing walls of the holder define the slot. Any arrangement of walls defining the slot are contemplated herein. In some embodiments, the slot may be open on one or more sides. Additionally, the base may further comprise a set screw or other mechanism to account for regrinds over the lifetime of the cutting insert.

In some embodiments, the slot places the cutting insert in an orientation for effective transfer of cutting forces to the base and into the cutting head without affecting the stability of the cutting insert. This can permit a reduction in one or more dimensions of the cutting insert. In some embodiments, for example, dimensions of the slot accommodate cutting inserts having one or more dimensions smaller than cutting insert dimensions according the International Organization for Standardization (ISO). The ability to use smaller inserts in conjunction with the holder can realize significant cost efficiencies, especially when the inserts comprise superhard materials such as cubic boron nitride (CBN), polycrystalline cubic boron nitride (PCBN), and/or polycrystalline diamond (PCD). The slot can have any desired cross-sectional geometry. Cross-sectional geometry of the slot can be polygonal and is generally governed by the cross-sectional geometry of the cutting insert.

The base and slot can be formed in the head of a cutting apparatus. The slot, for example, can be machined or otherwise formed into the cutting head of a milling apparatus. In some embodiments, the slot is formed in the cutting head in a manner to place the cutting insert in an orientation for tangential cutting. Alternatively, the holder is independent from the cutting apparatus and is configured to engage a pocket of a cutting apparatus. In some embodiments, the base of the holder is configured to engage the pocket at an angle to place the cutting insert in an orientation for tangential cutting. For example, the base of the holder can engage the pocket at an angle of 40 degrees to 50 degrees relative to the longitudinal axis of the cutting apparatus. The holder can engage the pocket by any desired means including, but not limited to, mechanical engagement. The holder, in some embodiments, can include a recess or aperture for interfacing with a clamp. In other embodiments, the holder can comprise a recess for coupling to the pocket via a screw. Alternatively, the holder can be brazed or otherwise bonded to the pocket.

Figure 2:
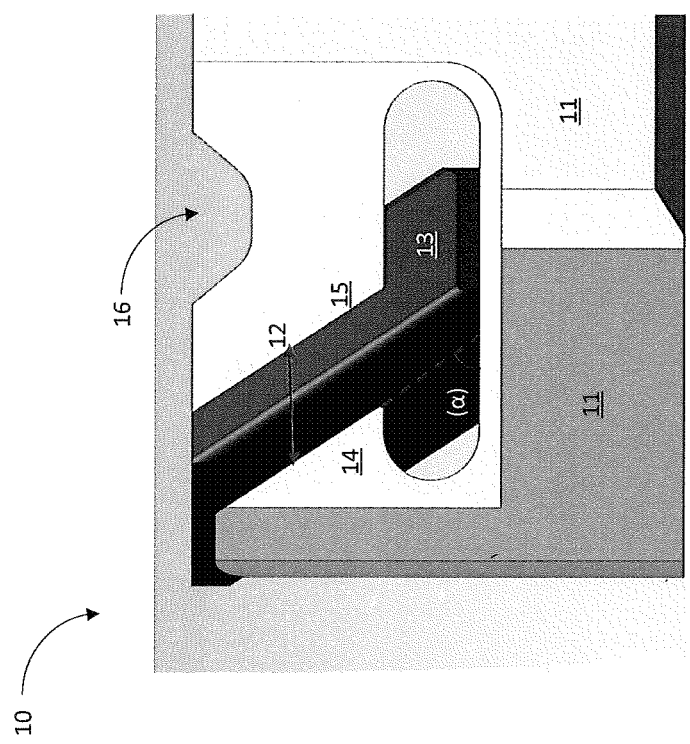
FIG. 2 is a side elevational view of the holder of FIG. 1.
Figure 3:
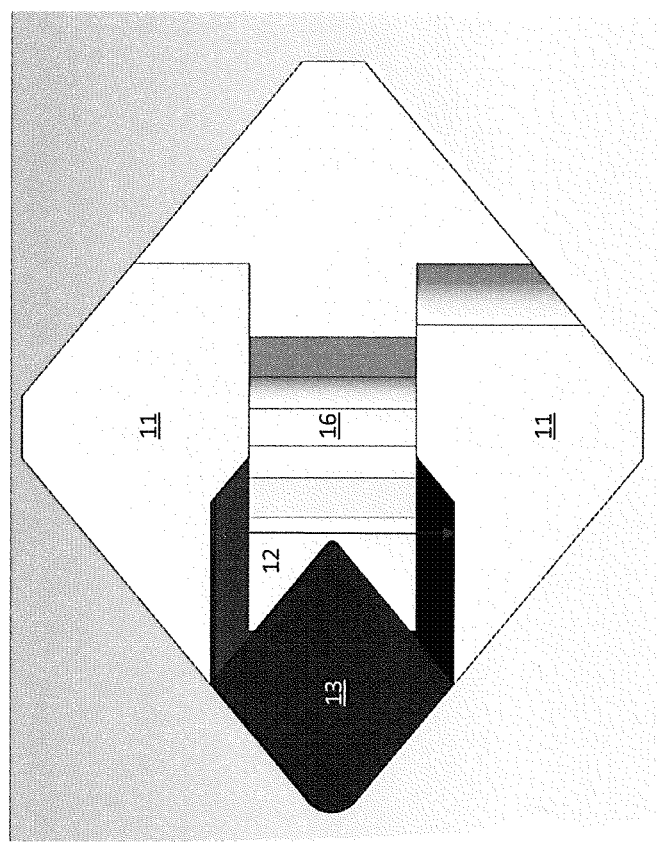
FIG. 3 is a top plan view of the holder of FIG. 1.

The foregoing embodiments are further illustrated by the following figures. FIG. 1 illustrates a perspective view of a cutting insert holder according to some embodiments. The holder of FIG. 1 is designed for engaging a pocket of the cutting apparatus. The holder 10 comprises a base 11 and a slot 12 forming an angle with the base 11. A cutting insert 13 is secured in the slot 12. The slot is formed by two opposing walls 14, 15 of the holder and is open on the remaining two sides. In the embodiment of FIG. 1, the holder 10 further comprises a recess 16 for engaging a clamp. The recess 16 is positioned between the slot 12 and back wall 17 of the holder. FIG. 2 is a side elevational view of the holder of FIG. 1. The slot 12 forms an inclination angle (a) with the base 11. (a) can have any value described hereinabove. The cutting insert 13 matches this angular orientation of the slot 12. The body of the cutting insert 13, for example, extends along the same inclination angle as the slot between top and bottom faces of the insert 13. When employed in a tangential cutting apparatus, the holder 10 and associated slot angle (a) can direct cutting forces into the base 11 for transfer into the pocket of the cutting apparatus, thereby further enhancing clamping rigidity and performance and lifetime of the cutting insert. FIG. 3 is a top plan view of the holder of FIG. 1. The angular disposition of the slot 12 and cutting insert 13 are further illustrated in FIG. 3. The recess 16 for receiving the clamp is also shown.

Cutting inserts of any desired composition and architecture can be used with holders described herein. In some embodiments, cutting insert comprise superhard materials including, but not limited to, CBN, PCBN, and PCD. The cutting inserts can comprise tables of superhard materials. Alternatively, the cutting inserts are entirely formed of superhard materials. Cutting inserts comprising ceramics, cermets and sintered cemented carbides can also be used with holders described herein.

In another aspect, cutting apparatus are described herein, including tangential cutting apparatus. A tangential cutting apparatus, for example, comprises a cutting head, and at least one holder for a cutting insert, the holder comprising a base, and a slot for receiving the cutting insert, wherein the slot forms an angle with the base ranging from 10 degrees to 60 degrees. In some embodiments, the base and slot are formed in the head of the tangential cutting apparatus. In other embodiments, the holder is independent from the cutting apparatus and is configured to engage a pocket of a cutting apparatus. The holder can comprise any design and/or properties described above including, but not limited to, the properties illustrated in FIGS. 1-3. In some embodiments, the tangential cutting apparatus comprises a plurality of holders described herein.

In a further aspect, methods of machining a workpiece are described. A method of machining a workpiece comprises providing a tangential cutting apparatus comprising a cutting head and at least one holder engaging a cutting insert, the holder comprising a base, and a slot for receiving the cutting insert, wherein the slot forms an angle with the base ranging from 10 degrees to 60 degrees. The workpiece is contacted with the cutting insert. In some embodiments, the cutting head is rotated to contact the workpiece with the cutting insert. A plurality of cutting inserts can be coupled to the cutting head via slotted holders, in some embodiments. The holder can comprise any design and/or properties described above including, but not limited to, the properties illustrated in FIGS. 1-3. In some embodiments, the tangential cutting apparatus comprises a plurality of holders described herein.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A holder for a cutting insert comprising:
 a base; and
 a first wall and a second wall spaced apart from and opposing the first wall forming a slot for receiving the cutting insert, the slot comprising first and second opposing side openings between the first wall and the second wall, the first and second opposing side openings extending from a top of the holder to an aperture in first and second walls of the holder, wherein the slot forms an angle with the base ranging from 10 degrees to 60 degrees, and wherein the slot orients a nose of the cutting insert to engage a workpiece for tangential cutting.

2. The holder of claim 1, wherein the angle ranges from 20 degrees to 35 degrees.

3. The holder of claim 1, wherein the angle places the cutting insert in an orientation to exhibit an included angle of at least 80 degrees.

4. The holder of claim 1, wherein the base and slot are formed in the head of a tangential cutting apparatus.

5. The holder of claim 1, wherein dimensions of the slot accommodate cutting inserts having one or more dimensions smaller than cutting insert dimensions according to the International Organization for Standardization (ISO).

6. The holder of claim 1, wherein the base is configured to engage a pocket of a tangential cutting apparatus.

7. The holder of claim 6, wherein the holder further comprises a recess for engaging a clamp.

8. The holder of claim 1 further comprising the cutting insert.

9. The holder of claim 8, wherein the cutting insert comprises a superhard material selected from the group consisting of polycrystalline cubic boron nitride (PcBN) and polycrystalline diamond (PCD).

10. The holder of claim 1, wherein the slot has a diamond shape cross-sectional shape.

11. A tangential cutting apparatus comprising:
 a cutting head; and
 at least one holder for a cutting insert, the holder comprising a base, and a first wall and a second wall spaced apart from and opposing the first wall forming a slot for receiving the cutting insert, the slot comprising first and second opposing side openings between the first wall and the second wall, the first and second opposing side openings extending from a top of the holder to an aperture in first and second walls of the holder, wherein the slot forms an angle with the base ranging from 10 degrees to 60 degrees, and wherein the slot orients a nose of the cutting insert to engage a workpiece for tangential cutting.

12. The tangential cutting apparatus of claim 11, wherein the angle ranges from 20 to 35 degrees.

13. The tangential cutting apparatus of claim 11, wherein the angle places the cutting insert in an orientation to exhibit an included angle of at least 80 degrees.

14. The tangential cutting apparatus of claim 11, wherein the base and slot are formed in the cutting head.

15. The tangential cutting apparatus of claim 11, wherein the cutting head comprises a pocket for receiving the holder.

16. The tangential cutting apparatus of claim 15, wherein the holder is mechanically secured to the pocket.

17. The tangential cutting apparatus of claim 11 further comprising the cutting insert in the slot.

18. The tangential cutting apparatus of claim 17, wherein the cutting insert comprises a superhard material selected from the group consisting of polycrystalline cubic boron nitride (PcBN) and polycrystalline diamond (PCD).

19. The tangential cutting apparatus of claim 11, wherein the apparatus is a milling cutter.

20. The tangential cutting apparatus of claim 11, wherein the slot has a diamond shape cross-sectional shape.

21. A method of machining a workpiece comprising:
providing a tangential cutting apparatus comprising a cutting head and at least one holder engaging a cutting insert, the holder comprising a base, and a first wall and a second wall spaced apart from and opposing the first wall forming a slot for receiving the cutting insert, the slot comprising first and second opposing side openings between the first wall and the second wall, the first and second opposing side openings extending from a top of the holder to an aperture in first and second walls of the holder, wherein the slot forms an angle with the base ranging from 10 degrees to 60 degrees; and
contacting the workpiece with a nose of the cutting insert for tangential cutting.

22. The method of claim 21, wherein the base and slot are formed in the cutting head.

23. The method of claim 21, wherein the cutting head comprises a pocket for receiving the holder.

24. The method of claim 21, wherein the slot has a diamond shape cross-sectional shape.

25. The method of claim 21, wherein the angle places the cutting insert in an orientation to exhibit an included angle of at least 80 degrees.

* * * * *